(12) United States Patent
Kremin et al.

(10) Patent No.: US 12,663,887 B2
(45) Date of Patent: ***Jun. 23, 2026

(54) STYLUS TO HOST SYNCHRONIZATION USING A MAGNETIC FIELD

(71) Applicant: Wacom Co., Ltd., Saitama (JP)

(72) Inventors: Viktor Kremin, Lviv (UA); Andriy Ryshtun, Lviv (UA)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/269,724

(22) Filed: Jul. 15, 2025

(65) Prior Publication Data

US 2025/0341905 A1 Nov. 6, 2025

Related U.S. Application Data

(63) Continuation of application No. 17/403,469, filed on Aug. 16, 2021, now Pat. No. 12,379,794, which is a (Continued)

(51) Int. Cl.
G06F 3/038 (2013.01)
G06F 1/3215 (2019.01)
(Continued)

(52) U.S. Cl.
CPC .......... G06F 3/0383 (2013.01); G06F 1/3215 (2013.01); G06F 1/3259 (2013.01); G06F 3/03545 (2013.01); G06F 3/03547 (2013.01); G06F 3/04162 (2019.05); G06F 3/04166 (2019.05); G06F 3/0441 (2019.05); G06F
*3/0442* (2019.05); *G06F 3/0446* (2019.05); *G06F 2203/04104* (2013.01); *G06F 2203/04106* (2013.01)

(58) Field of Classification Search
CPC ........................... G06F 3/03545; G06F 3/0354
See application file for complete search history.

(56) References Cited

U.S. PATENT DOCUMENTS 4,686,332 A 8/1987 Greanias et al.
5,117,071 A 5/1992 Greanias et al.
(Continued)

FOREIGN PATENT DOCUMENTS

GB 2462170 A 2/2010
JP 2009187076 A 8/2009

OTHER PUBLICATIONS

Anusha Withana et al., "ImpAct: Immersive Haptic Stylus to Enable Direct Touch and Manipulation for Surface Computing," Computers in Entertainment (CIE), vol. 9 Issue 2 Article 9, Dec. 2010.

(Continued)

*Primary Examiner* — Priyank J Shah
(74) *Attorney, Agent, or Firm* — Seed Intellectual Property Law Group LLP

(57) ABSTRACT

A system and method for synchronizing a stylus to a capacitive sense array. The system including a capacitive sense array which includes a plurality of electrodes. A magnetic field is generated using the plurality of electrodes. The magnetic field is used to synchronize the operation of the stylus and the capacitive sense array.

20 Claims, 9 Drawing Sheets

Related U.S. Application Data continuation of application No. 16/258,256, filed on Jan. 25, 2019, now Pat. No. 11,093,055, which is a continuation of application No. 13/431,648, filed on Mar. 27, 2012, now Pat. No. 10,228,780.

(60) Provisional application No. 61/599,332, filed on Feb. 15, 2012.

(51) Int. Cl.

| | |
|---|---|
| *G06F 1/3234* | (2019.01) |
| *G06F 3/0354* | (2013.01) |
| *G06F 3/041* | (2006.01) |
| *G06F 3/044* | (2006.01) |

(56) References Cited

U.S. PATENT DOCUMENTS

| | | | |
|---|---|---|---|
| 5,386,219 | A | 1/1995 | Greanias et al. |
| 5,414,227 | A | 5/1995 | Schubert et al. |
| 6,002,387 | A | 12/1999 | Ronkka et al. |
| 6,081,261 | A | 6/2000 | Wolff et al. |
| 6,133,906 | A | 10/2000 | Geaghan |
| 6,441,810 | B1 | 8/2002 | Skoog et al. |
| 6,690,156 | B1 | 2/2004 | Weiner et al. |
| RE39,881 | E | 10/2007 | Flowers |
| 7,372,455 | B2 | 5/2008 | Perski et al. |
| 7,552,861 | B2 | 6/2009 | Chen et al. |
| 7,557,939 | B2 | 7/2009 | Marggraff et al. |
| 7,612,767 | B1 | 11/2009 | Griffin et al. |
| 7,812,268 | B2 | 10/2010 | Ely |
| 8,400,427 | B2 | 3/2013 | Perski et al. |
| 2003/0016210 | A1 | 1/2003 | Soto et al. |
| 2004/0021463 | A1 | 2/2004 | Miyazawa et al. |
| 2004/0095333 | A1 | 5/2004 | Morag et al. |
| 2004/0104899 | A1 | 6/2004 | Hong et al. |
| 2005/0110778 | A1 | 5/2005 | Ben Ayed |
| 2005/0162411 | A1 | 7/2005 | Berkel van |
| 2006/0012581 | A1 | 1/2006 | Haim et al. |
| 2007/0062852 | A1 | 3/2007 | Zachut et al. |
| 2007/0085836 | A1 | 4/2007 | Ely |
| 2007/0171211 | A1 | 7/2007 | Perski et al. |
| 2008/0023232 | A1 | 1/2008 | Morag et al. |
| 2008/0055279 | A1 | 3/2008 | Osada et al. |
| 2008/0106520 | A1 | 5/2008 | Free et al. |
| 2008/0128180 | A1 | 6/2008 | Perski et al. |
| 2008/0149401 | A1 | 6/2008 | Hagen et al. |
| 2008/0149402 | A1 | 6/2008 | Vos |
| 2008/0150550 | A1 | 6/2008 | Vos |
| 2008/0150658 | A1 | 6/2008 | Vos |
| 2008/0150916 | A1 | 6/2008 | Vos |
| 2008/0150917 | A1 | 6/2008 | Libbey et al. |
| 2008/0150918 | A1 | 6/2008 | Hagen et al. |
| 2008/0156546 | A1 | 7/2008 | Hauck |
| 2008/0158165 | A1 | 7/2008 | Geaghan et al. |
| 2008/0316669 | A1 | 12/2008 | May |
| 2009/0078476 | A1 | 3/2009 | Rimon et al. |
| 2009/0251434 | A1 | 10/2009 | Rimon et al. |
| 2009/0256825 | A1 | 10/2009 | Klinghult et al. |
| 2010/0059295 | A1 | 3/2010 | Hotelling et al. |
| 2010/0066693 | A1 | 3/2010 | Sato et al. |
| 2010/0073323 | A1 | 3/2010 | Geaghan |
| 2010/0085325 | A1 | 4/2010 | King-Smith et al. |
| 2010/0155153 | A1 | 6/2010 | Zachut |
| 2010/0170726 | A1 | 7/2010 | Yeh et al. |
| 2010/0220062 | A1 | 9/2010 | Antila |
| 2010/0252335 | A1 | 10/2010 | Orsley |
| 2010/0265189 | A1 | 10/2010 | Rofougaran |
| 2011/0084846 | A1 | 4/2011 | Li et al. |
| 2011/0090146 | A1 | 4/2011 | Katsurahira |
| 2011/0122087 | A1 | 5/2011 | Jang et al. |
| 2011/0162894 | A1 | 7/2011 | Weber |
| 2011/0169775 | A1 | 7/2011 | Liaw et al. |
| 2011/0267311 | A1 | 11/2011 | Yeh |
| 2011/0285454 | A1 | 11/2011 | Bayramoglu |
| 2012/0013555 | A1 | 1/2012 | Maeda et al. |
| 2012/0050207 | A1 | 3/2012 | Westhues et al. |
| 2012/0062497 | A1 | 3/2012 | Rebeschi et al. |
| 2012/0068964 | A1 | 3/2012 | Wright et al. |
| 2012/0105361 | A1 | 5/2012 | Kremin et al. |
| 2012/0327041 | A1 | 12/2012 | Harley et al. |
| 2013/0106722 | A1 | 5/2013 | Shahparnia et al. |
| 2013/0106760 | A1 | 5/2013 | Pedersen et al. |
| 2013/0169581 | A1* | 7/2013 | Small ..................... G06F 3/041 |
| | | | 345/173 |
| 2013/0207938 | A1 | 8/2013 | Ryshtun et al. |
| 2013/0207939 | A1 | 8/2013 | Kremin et al. |
| 2017/0131798 | A1 | 5/2017 | Geaghan et al. |
| 2017/0153763 | A1 | 6/2017 | Vavra et al. |
| 2018/0321760 | A1 | 11/2018 | Kremin et al. |

OTHER PUBLICATIONS

International Search Report/Written Opinion for PCT/US2012/52923 dated Nov. 6, 2012, 7 pages.

International Search Report/Written Opinion for PCT/US2012/53471 dated Nov. 16, 2012, 7 pages.

Juan Wang et al., "Clock Recovery and Audio/Video Synchronization in Digital TV System," China Cable Television, 2004, pp. 17-19. (with English abstract & machine translation).

Juan-Yao Ruan et al., "A Multi-Touch Interface Circuit for a Large-Sized Capacitive Touch Panel," IEEE Sensors 2010 Conference, pp. 309-314.

* cited by examiner

⊙ — — → Vertical H-field coming out of the page.

⊗ — — → Vertical H-field going into the page.

STYLUS TO HOST SYNCHRONIZATION USING A MAGNETIC FIELD

CROSS-REFERENCE TO RELATED APPLICATIONS

This application claims the benefit of U.S. Provisional Application No. 61/599,332, filed on Feb. 15, 2012, and is a continuation of U.S. application Ser. No. 13/431,648, filed on Mar. 27, 2012, now U.S. Pat. No. 10,228,780, issued on Mar. 12, 2019; and is a continuation of U.S. application Ser. No. 16/258,256 filed Jan. 25, 2019, now U.S. Pat. No. 11,093,055, issued on Aug. 17, 2021, and is a continuation of U.S. application Ser. No. 17/403,469, filed Aug. 16, 2021, the contents of which are hereby incorporated by reference herein.

BACKGROUND

Technical Field

This disclosure relates to the field of user interface devices and, in particular, to capacitive sensor devices.

Description of the Related Art

The use of a stylus with a touch screen interface is well established. Touch screen designs have incorporated many different technologies including resistive, capacitive, inductive, and radio frequency sensing arrays. Resistive touch screens, for example, are passive devices well suited for use with a passive stylus. The original PalmPilots™ devices from the mid-1990s were one of the first successful commercial devices to utilize a resistive touch screen designed for use with a stylus and helped to popularize that technology. Although resistive touch screens can sense the input from nearly any object, multi-touch is generally not supported. An example of a multi-touch application may be applying two or more fingers to the touch screen. Another example may be inputting a signature, which may include simultaneous palm and stylus input signals. Due to these and other numerous disadvantages, capacitive touch screens are increasingly replacing resistive touch screens in the consumer marketplace.

Various tethered active stylus approaches have been implemented for use with touch screens and are found in many consumer applications such as point-of-sale terminals (e.g., the signature pad used for credit card transactions in retail stores) and other public uses.

BRIEF DESCRIPTION OF THE SEVERAL VIEWS OF THE DRAWINGS

The present disclosure is illustrated by way of example, and not of limitation, in the figures of the accompanying drawings in which.

DETAILED DESCRIPTION

In the following description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description. Thus, the specific details set forth are merely exemplary. Particular implementations may vary from these exemplary details and still be contemplated to be within the scope of the present disclosure. Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

Apparatuses and methods of synchronizing a stylus to a capacitive sense array are described. In one embodiment, the capacitive sense array is configured to transmit an electrical signal or current through a plurality of electrodes and generate a magnetic field using the plurality of electrodes. In one embodiment, the stylus may detect the magnetic field generated by the capacitive sense array and may synchronize its operation to the operation of a host, using the magnetic field. In one embodiment, the stylus may transmit a TX signal while the stylus detects the magnetic field and a host may listen for the transmit signal while the capacitive sense array generates the magnetic field.

In another embodiment, the stylus may transmit a TX signal after the stylus no longer detects the magnetic field and a host may listen for the transmit signal after the capacitive sense array stops generating the magnetic field.

Figure 1:
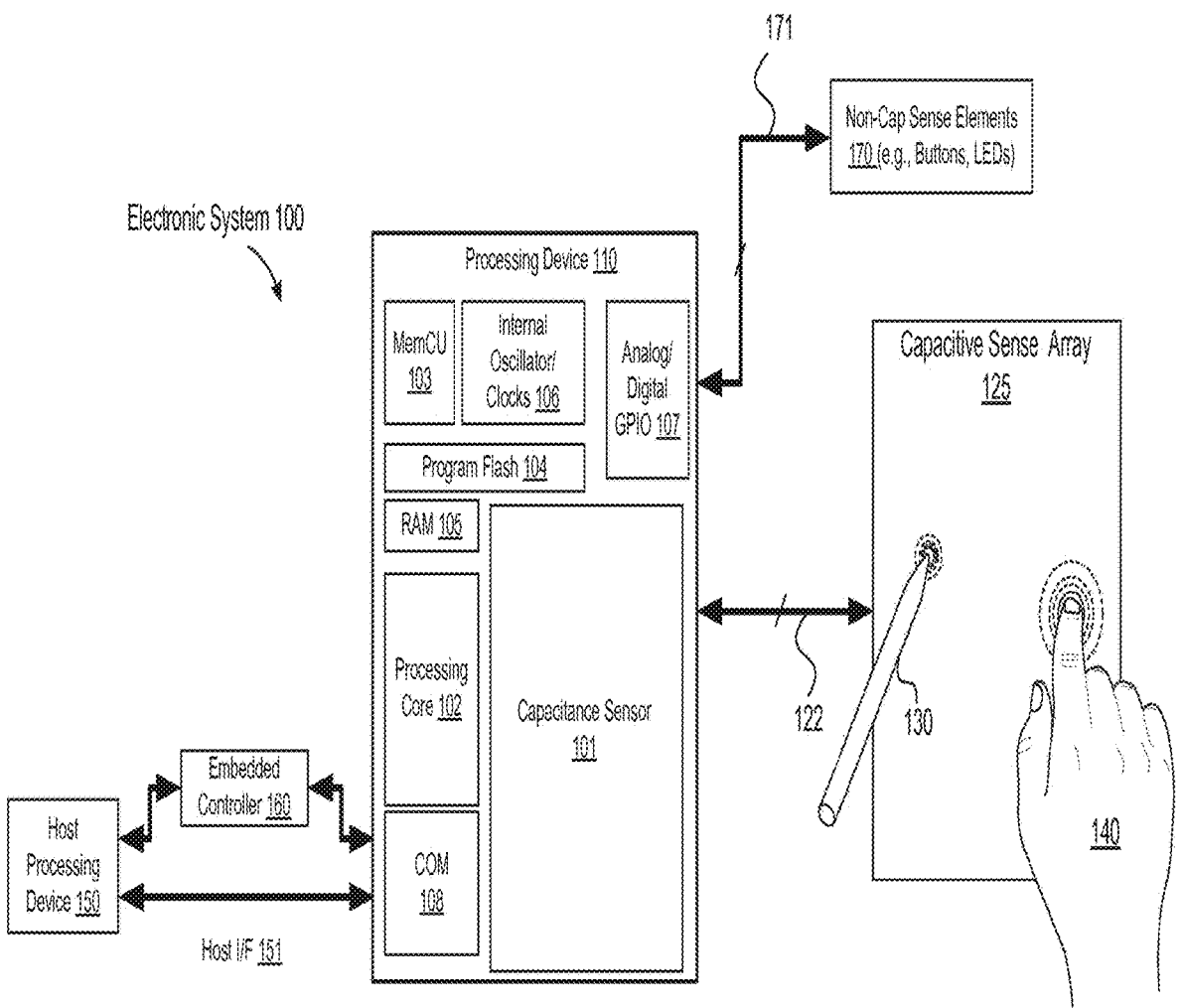
FIG. 1 is a block diagram illustrating one embodiment of an electronic system having a processing device for detecting a presence of a touch object and a stylus.

FIG. 1 is a block diagram illustrating one embodiment of an electronic system 100 having a processing device 110 for detecting a presence of a touch object 140 and a stylus 130. Electronic system 100 includes processing device 110, capacitive sense array 125, stylus 130, host processing device 150, embedded controller 160, and non-capacitive sense elements 170. In the depicted embodiment, the electronic system 100 includes the capacitive sense array 125 coupled to the processing device 110 via bus 122. The capacitive sense array 125 may include a multi-dimension capacitive sense array. The multi-dimension sense array includes multiple sense elements, organized as rows and columns. In another embodiment, the capacitive sense array 125 operates as an all-points-addressable ("APA") mutual capacitive sense array. In another embodiment, the capacitive sense array 125 operates as a coupled-charge receiver. Alternatively, other configurations of capacitive sense arrays may be used. In one embodiment, the capacitive sense array 125 may be included in an ITO panel or a touch screen panel.

The operations and configurations of the processing device 110 and the capacitive sense array 125 for detecting and tracking the touch object 140 and stylus 130 are described herein. In short, the processing device 110 is configured to detect a presence of the active stylus 130 on the capacitive sense array 125, as well as a presence of the touch object 140. The processing device 110 may detect and track the active stylus 130 and the touch object 140 individually on the capacitive sense array 125. In one embodiment, the processing device 110 can detect and track both the active stylus 130 and touch object 140 concurrently on the capacitive sense array 125. In one embodiment, the processing device 110 is configured to operate as the timing "master," and the active stylus 130 adjusts its timing to match that of the processing device 110 when the active stylus 130 is in use. In one embodiment, the capacitive sense array 125 capacitively couples with the active stylus 130, as opposed to conventional inductive stylus applications. It should also be noted that the same assembly used for the capacitive sense array 125, which is configured to detect touch objects 140, is also used to detect and track the active stylus 130 without an additional PCB layer for inductively tracking the active stylus 130 as done conventionally.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configured to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MemCU") 103 coupled to memory and the processing core 102.

The processing device 110 may also include an analog block array (not shown). The analog block array is also coupled to the system bus. Analog block array also may be configured to implement a variety of analog circuits (e.g., ADCs or analog filters) using, in one embodiment, configurable UMs. The analog block array may also be coupled to the GPIO 107.

As illustrated, capacitance sensor 101 may be integrated into processing device 110. Capacitance sensor 101 may include analog I/O for coupling to an external component, such as capacitive sense array 125, touch-sensor slider (not shown), touch-sensor buttons (not shown), and/or other devices. The capacitance sensor 101 may be configured to measure capacitance using mutual capacitance sensing techniques, self capacitance sensing technique, charge coupling techniques or the like. In one embodiment, capacitance sensor 101 operates using a charge accumulation circuit, a capacitance modulation circuit, or other capacitance sensing methods known by those skilled in the art. In an embodiment, the capacitance sensor 101 is of the Cypress TMA-4xx family of touch screen controllers. Alternatively, other capacitance sensors may be used. The mutual capacitive sense arrays, or touch screens, as described herein, may include a transparent, conductive sense array disposed on, in, or under either a visual display itself (e.g., LCD monitor), or a transparent substrate in front of the display. In one embodiment, the transmit (TX) and received (RX) electrodes are configured in rows and columns, respectively. It should be noted that the rows and columns of electrodes can be configured as TX or RX electrodes by the capacitance sensor 101 in any chosen combination. In one embodiment, the TX and RX electrodes of the sense array 200 are configured to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual capacitance sensing. The capacitance sensor 101 does not use mutual capacitance or self-capacitance sensing to measure capacitances of the sense elements when performing a stylus scan. Rather, the capacitance sensor 101 measures a charge that is capacitively coupled between the sense array 125 and the stylus 130 as described herein. The capacitance associated with the intersection between a TX electrode and an RX electrode can be sensed by selecting every available combination of TX electrode and RX electrode. When a touch object, such as a finger or stylus, approaches the capacitive sense array 125, the object causes a decrease in capacitance affecting some of the electrodes. Thus, the location of the finger on the capacitive sense array 125 can be determined by identifying both the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of algorithms (e.g., interpolation algorithms, centroid algorithms, etc.) may be used to detect the center of the touch as would be appreciated by one of ordinary skill in the art having the benefit of this disclosure.

In an embodiment, the electronic system 100 may also include non-capacitive sense elements 170 coupled to the processing device 110 via bus 171 and GPIO port 107. The non-capacitive sense elements 170 may include buttons, light emitting diodes ("LEDs"), and other user interface devices, such as a mouse, a keyboard, or other functional keys that do not use capacitance sensing. In one embodiment, buses 121, 122, and 171 are embodied in a single bus. Alternatively, these buses may be configured into any combination of one or more separate buses.

Processing device 110 may include internal oscillator/clocks 106 and communication block ("COM") 108. In another embodiment, the processing device 110 includes a spread spectrum clock (not shown). The oscillator/clocks block 106 provides clock signals to one or more of the components of processing device 110. Communication block 108 may be used to communicate with an external component, such as a host processing device 150, via host interface ("I/F") line 151. Alternatively, processing device 110 may also be coupled to embedded controller 160 to communicate with the external components, such as host processing device 150. In one embodiment, the processing device 110 is configured to communicate with the embedded controller 160 or the host processing device 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

Capacitance sensor 101 may be integrated into the IC of the processing device 110, or alternatively, in a separate IC. Alternatively, descriptions of capacitance sensor 101 may be generated and compiled for incorporation into other integrated circuits. For example, behavioral level code describing the capacitance sensor 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance sensor 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, a smart phone, a global position system ("GPS") device, or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (e.g., volume, track advance, etc) handwriting recognition, and numeric keypad operation.

Figure 2:
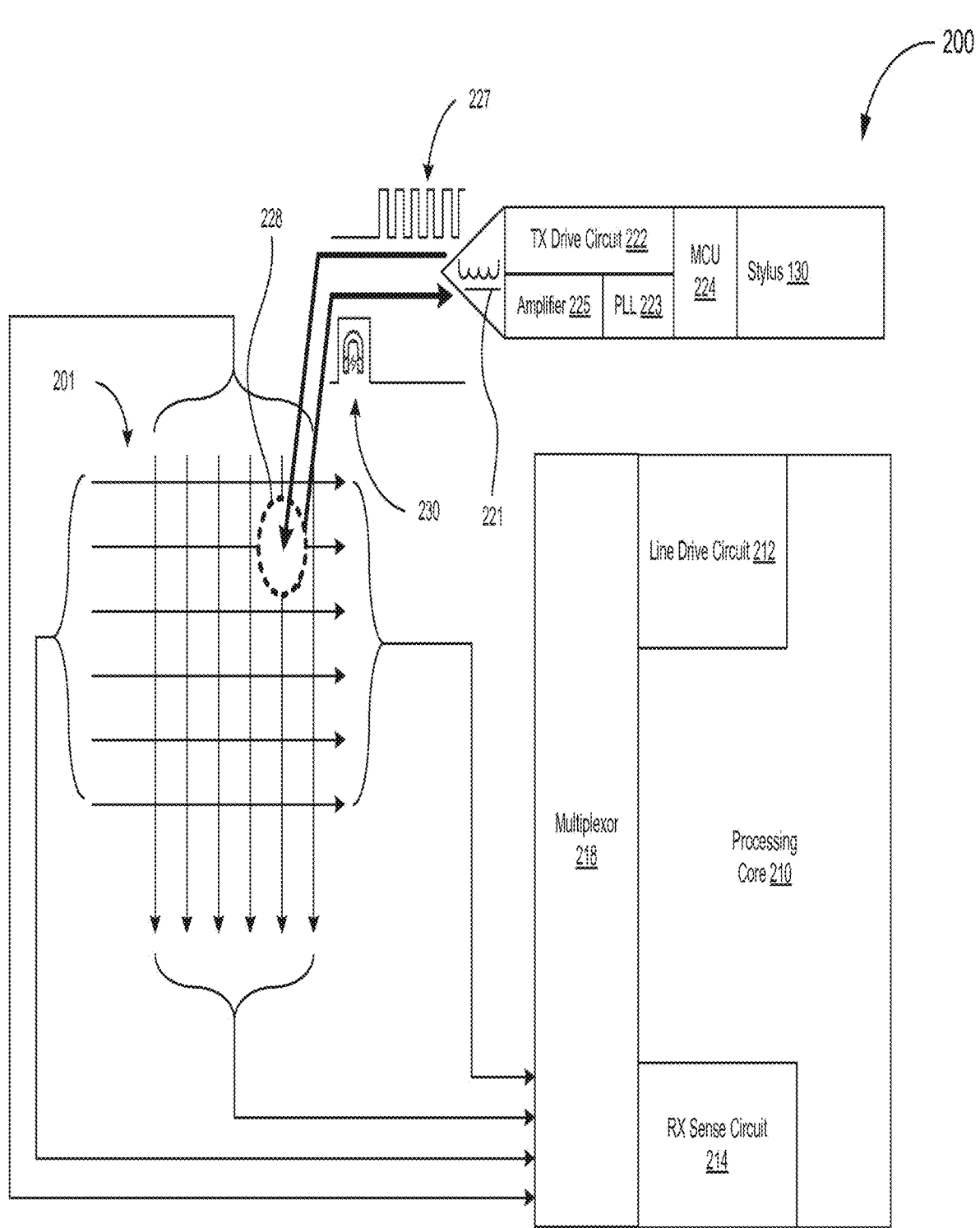
FIG. 2 is a block diagram illustrating one embodiment of a system including a capacitive sense array, a stylus, and a processing device that converts measured signals to touch coordinates.

FIG. 2 is a block diagram illustrating one embodiment of a system 200 including a capacitive sense array 201, a stylus 130, and a processing device 110 that converts measured signals to touch coordinates. The processing device 110 includes a processing core 210, a line drive circuit 212, a RX sense circuit 214, and a multiplexer 218. In one embodiment, the processing core 210 is similar to the capacitance sensor 101 described above. The sense array 201 includes multiple lines that can be configured as TX lines or RX lines. For example, in one mode, the line drive circuit 212 drives a TX signal on a first set of TX lines (e.g., the horizontal lines), and the RX sense circuit 214 measures signals on a second set of RX lines (e.g., the vertical lines). In another mode, the TX lines are RX lines and the RX sense circuit 214 is configured to measure signals on two sets of RX lines (e.g., on both the vertical and horizontal lines). These sets of RX lines can be considered as separate receive channels for stylus signal sensing. It should be noted that TX and RX lines are also referred to as TX and RX electrodes. The multiplexer 218 can be used to connect the TX lines or the RX lines to the line drive circuit 212 or the RX sense circuit 214 based on whether the lines are being used as RX lines or TX lines. Although the multiplexer 218 is shown as part of the processing device 110, in other embodiments, the processing device 110 may not include the multiplexer 218.

In one embodiment, during normal finger scanning, a passive object (e.g., a finger or other conductive object) touches the sense array 201 at a contact point (not illustrated in FIG. 2). The line drive circuit 212 drives the TX lines with a TX signal. The RX sense circuit 214 measures the RX signals on RX lines. In an embodiment, the processing core 210 determines the location of contact point based on the mapping techniques as would be appreciated by one of ordinary skill in the art having the benefit of this disclosure. Alternatively, other techniques may be used to determine the contact point. The TX lines and RX lines are multiplexed by multiplexor 218. The processing core 210 provides the TX signal on the TX lines (rows) and measures the capacitance coupling on the RX lines (columns). In an embodiment, the TX and RX lines are orthogonal and may be used interchangeably (e.g., transmitting on columns and receiving on rows). In an embodiment, the line drive circuit 212 transmits the TX signal through a high impedance ITO panel (TX lines), thus limiting the upper frequency limit and speed of the system. The total scan time may also dependent upon the number of TX lines and RX lines in the sense array 201. For example, the line drive circuit 212 provides a TX signal on a TX line and simultaneously reads the capacitively coupled RX signal on a RX line, according to one embodiment. In another embodiment, the RX lines are multiplexed in two or more scans.

In one embodiment, during stylus scanning, the stylus TX drive circuit 222 of stylus 130 provides a TX signal 227 directly to contact point 228 on sense array 201, thus eliminating the need to dedicate the second set of RX lines (previously TX in finger scanning) to transmitting a TX signal from the line drive circuit 212. As such, the RX sense circuit 214 measures the RX signal on both the first set of RX lines (rows) and a second set of RX lines (columns) of sense array 201. This may result in faster position tracking because the TX signal no longer passes through two high impedance ITO lines (e.g., pass from the TX line through to the RX line), thus reducing the scan time to the total RX measurement.

The active stylus 130 includes a magnetic field sensor 221, the TX drive circuit 222, a microcontroller (MCU) 224, an amplifier 225, and a phase-locked-loop (PLL) circuit 223. In one embodiment, the processing core 210 performs a normal scan of the sense array 201 during RX sensing of TX signal from the line drive circuit 212 (described above), and a stylus scan of the sense array 201 during RX sensing of the stylus TX signal 227 (illustrated in FIG. 2). For the stylus scan, the processing core 210 measures a charge being capacitively coupled to the row and column electrodes of the sense array from the stylus. To further illustrate, a mutual capacitance scan uses both a TX and RX signal to track an object. As described above, this is typically done by scanning the RX lines for the driven TX line in a successive fashion by the processing core 210. In an array of N rows (TX signal) and M columns (RX signal), a complete scan would perform N.times.M total scans if one RX line is sensed at a time. For example, transmitting a TX signal ("TX'ing") on row 1, and receiving a receive signal ("RX'ing") on columns 1-M, followed by TX'ing on row 2 and RX'ing on columns 1-M, and so on in sequential fashion. Alternatively, more RX lines can be sensed at a time. In one embodiment, 4 or 8 RX lines are sensed at a time, but in other embodiments, all RX lines may be sensed simultaneously or sequentially. With multiple RX channels to sense more than one RX line at the same time, the complete scan would be (N*M)/(#RX channels). In contrast, a stylus scan may not use a TX signal by the line drive circuit 212 and a complete scan would perform a single RX signal measurement on each row and column, or N+M scans, thus resulting in a significantly reduced stylus scanning time for the entire sense array as compared with mutual capacitance scanning time for the entire sense array. Like above, multiple RX channels can be used to sense multiple RX lines at the same time. In this case, the complete scan would be (N+M)/(#RX channels).

In the depicted embodiment, the TX drive circuit 222 generates a stylus TX signal 227 from the tip of the active stylus 130 into the touch screen. The processing core 210 senses this signal and resolves this to be the point of the active stylus 130. Synchronization between the processing core 210 sensing and the TX signal 227 generated by the active stylus 130 is used to obtain correct operation. In one embodiment, this synchronization may be performed using one or more of the lines of the sense array 201 to generate a magnetic field 230. The magnetic field may be generated by propagating or transmitting an electric current (e.g., a signal) through one or more lines of the sense array 201. In one embodiment, the magnetic field 230 may be an H-field (e.g., a type of magnetic field). The active stylus 130 may detect (e.g., sense) this H-field (e.g., the magnetic field) using the magnetic field sensor 221. The magnetic field sensor 221 may generate data or information to indicate whether an H-field has been detected (e.g., the magnetic field sensor may generate a signal only if an H-field is detected or only when an H-field is not detected).

The signals (e.g., the data or information) generated by the magnetic field sensor 221 are provided to the amplifier 225 which amplifies the signal and provides the signal to the PLL circuit 223. The PLL circuit 223 may synchronize the operation of the stylus 130 to the timing of the magnetic field 230 (e.g., the H-field) by generating a synchronization or timing signal. The PLL circuit 223 may provide the timing or synchronization signal to the MCU 244 which processes the timing or synchronization signal to synchronize the timing of the sensing performed by the processing core 210 and the transmission of the TX signal 227 by the active stylus 130.

In one embodiment, the stylus 130 may transmit the TX signal 227 when the stylus 130 does not detect the magnetic field 230. For example, the sense array 201 may generate the magnetic field 230 (e.g., the H-field) for a period of time. The stylus 130 may detect the H-field during this period of time. After stylus 130 detects that the sense array 210 has stopped generating the H-field, the stylus 130 may transmit the TX signal 227. In another embodiment, the stylus 130 may transmit the TX signal 227 when the stylus 130 detects the magnetic field 230 (not shown in FIG. 2). For example, the sense array 201 may generate the magnetic field 230 (e.g., the H-field) for a period of time. The stylus 130 may detect the H-field and transmit the TX signal 227 while it is still able to detect the H-field. If the stylus 130 no longer detects the H-field, the stylus 130 stops transmitting the TX signal 227.

In some embodiments, magnetic field (e.g., the H-field) 230 may be generated using one or more lines of the sense array 201 in a variety of methods. For example, every other vertical line or every other horizontal line in the sense array 201 may be used to generate the magnetic field 230. In another example, the vertical lines may be used to generate the magnetic field 230 for a period of time, followed by the horizontal lines. In a further example, the magnetic field 230 may be generated by the sequentially using the lines of the sense array (e.g., the first vertical line may transmit the synchronization signal, followed by the second vertical line, followed by the third vertical line, etc.). In yet another, the lines along the outer perimeter of the sense array 201 may be used to generate the magnetic field 230. In one embodiment, multiple lines of the sense array 201 may be coupled in series, which may increase the strength of the magnetic field 230.

As described above, a passive stylus may be used as a touch object to interface with the various touch screens described above. In contrast to passive styluses, an active stylus 130 provides the transmit signal 227 (TX signal). This signal 227 may be provided to the active stylus 130 by the processing core 210 as part of the synchronization. The active stylus 130 capacitively couples the stylus TX signal 227 to the sense array 201. In an embodiment, the stylus signal amplitude, frequency, phase, etc., may be the same or similar to that which is utilized for finger sensing by the processing core 210. Alternatively, the stylus TX signal may be different than the TX signal from the line drive circuit 212, in amplitude, frequency, and phase. In another embodiment, the stylus TX signal may have a different code for code modulation than a code used in the TX signal from the line drive circuit 212. In an exemplary embodiment, the stylus TX signal 227 has greater amplitude than the finger sensing TX signal from the line drive circuit 212. For example, in one exemplary embodiment, the stylus TX signal 227 ranges from approximately 20-50V, as compared with the approximately 5-10V typically provided by the processing core 210. Alternatively, other voltages may be used as would be appreciated by one of ordinary skill in the art. The higher stylus TX voltage couples more charge to the sense array 201 more quickly, thus reducing the amount of time used to sense each row and column of the sense array 201. Other embodiments may incorporate higher voltages on the sense array TX lines to obtain similar time efficiency improvements for finger sensing.

In an embodiment, the active stylus 130 applies a higher frequency on the stylus TX signal 227 than the TX signal frequency from line drive circuit 212 to achieve a reduced sensing time. Charge may be capacitively coupled from the active stylus 130 to the sense array 201 during the rising and falling edges of the stylus TX signal 227. Thus, a higher TX frequency provides a greater number of rising and falling edges over a given period of time, resulting in greater charge coupling. The practical upper limit of the TX frequency in finger sensing mode (e.g., TX signal on sense array 201 for finger sensing) is dependent upon the resistor-capacitor ("RC") time constant of the panel's individual sense elements and interconnect (not shown). This is typically due to high impedance materials (e.g., ITO) used in the fabrication of the sense array 201. A high-impedance sense array (e.g., sense array 201) may result in a high time constant and resulting signal attenuation of the rows (TX lines) and columns (RX lines) of sense elements, which may limit the maximum sensing frequency. When using an active stylus to transmit the stylus TX signal 227 directly to a contact point 228 on sense array 201, the stylus TX signal 227 does not pass through the high impedance path, and therefore the maximum operating frequency for the stylus TX signal 227 can be increased. For example, the time constant of the RX traces (both rows and columns) may be used to determine an upper frequency limit, but this will typically be is at least double the upper frequency limit used in finger sensing. Typically the impedance is half to the impedance when performing mutual capacitance scanning, since the row's impedance is eliminated and the column's impedance remains (or vice versa). It should be noted that both finger sensing and stylus sensing use frequency selection where the operation period should be smaller than the panel's time constant; so, restrictions for the operation frequency selection are approximately the same for finger and stylus sensing.

Although the lines (electrodes) appear as lines in FIG. 2, these lines may represent bars or elongated rectangles or other tessellated shapes such as diamonds, rhomboids, and chevrons. Alternatively, other useable shapes may be used as would be appreciated by one of ordinary skill in the art having the benefit of this disclosure.

Figure 3:
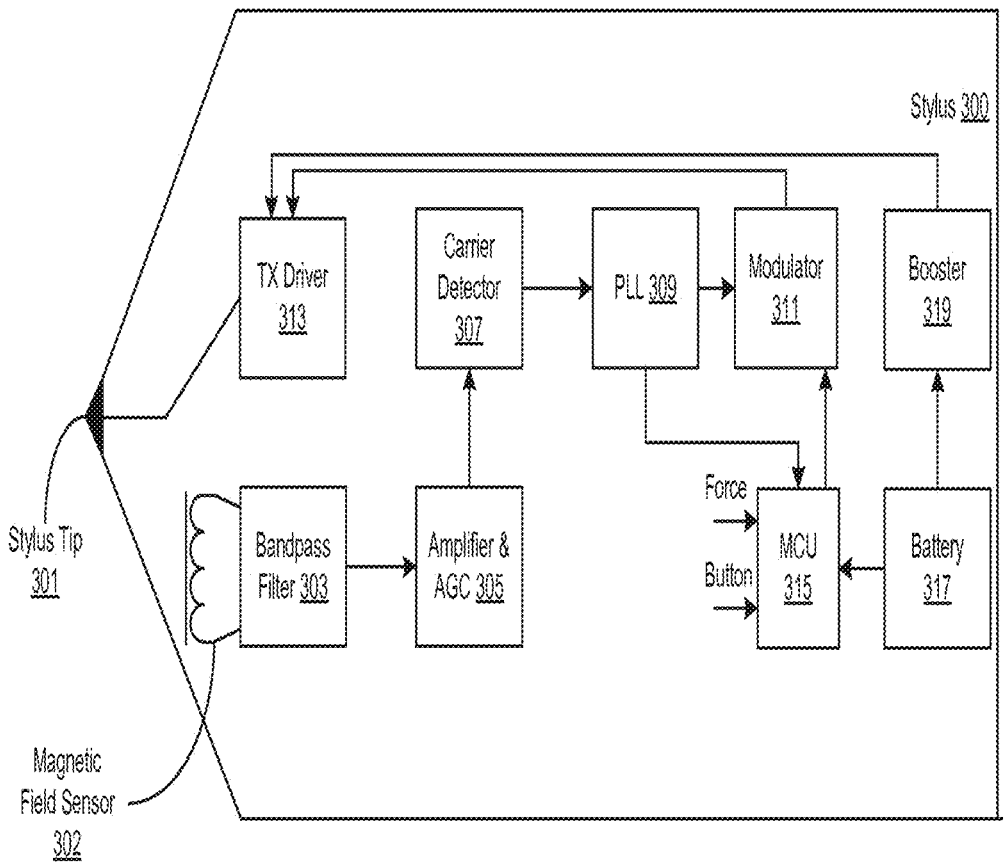
FIG. 3 is a block diagram illustrating one embodiment of a stylus.

FIG. 3 is a block diagram illustrating one embodiment of a stylus 300. The stylus 300 includes a stylus tip 301, a magnetic field sensor 302, a bandpass filter 303, an amplifier/automatic gain control (AGC) circuit 305, a carrier detector 307, a PLL circuit 309, a modulator 311, a transmit (TX) driver 313, an MCU 315, a battery 317, and a booster 319.

In one embodiment, the magnetic field sensor 302 may be one or more of a Hall Effect sensor, a giant magneto resistive sensor, a coil sensor, or any other type of sensor which may be used to detect magnetic fields (e.g., H-fields). The magnetic field sensor 302 may detect an H-field generated by one or more lines in a sense array and may generate a signal based on whether an H-field is detected. The signal generated by the magnetic field sensor 302 is provided to the bandpass filter 303. The bandpass filter 303 filters out noise signals generated by other components of the stylus and the host device (e.g., power suppliers, speakers, etc.). The output of the bandpass filter 303 is connected to the input for the amplifier and automatic gain control (AGC) circuit 305 which amplifies the signal and provides an automatic gain control loop to maintain a constant signal amplitude over a wide-input-signal voltage range. The amplifier and AGC circuit 305 provides the signal to the carrier detector 307. The carrier detector 307 analyzes the magnetic field signal provided by the amplifier and AGC circuit 305. In one embodiment, if the signal has a specified amplitude and frequency, the signal is passed to the PLL circuit 309. In another embodiment, the carrier detector 307 prevents the PLL circuit 309 from using an incorrect or weak signal for synchronization and prevents parasitic locks. In one embodiment, the PLL circuit 309 synchronizes the operation of the stylus 300 to the timing of the magnetic field detected by the magnetic sensor 302. As discussed above, PLL circuit may generate a synchronization signal when the magnetic field sensor 302 does not detect the H-field, or, may generate a synchronization signal when the bandpass filter 303 does detect the H-field. In one embodiment, the PLL circuit 309 may also provide frequency conversion of the synchronization signal (e.g., may divide or multiply the frequency of the synchronization signal by a number such as an integer or a non-integer).

The PLL 309 may provide the timing or synchronization signal (TX) to the modulator 311 and the MCU 315. The MCU 315 generates a TX signal and provides the TX signal to the modulator 311. The MCU 315 may also receive force data or button data from other sensors or components (not shown in the figures) in the stylus 300. The modulator 311 may modify or change the TX signal from the PLL according to data provided by the MCU 315. For example, the modulator 311 may perform one or more of amplitude, phase, frequency modulation, or some other type of modulation, based on input from the MCU 315. The modulated signal is provided to the TX driver 313. The TX driver 313 provides the TX signal to the stylus tip 301 where the TX signal is capacitively coupled to a sense array. The battery 317 may provide power to the MCU 215 to generate the TX signal and may also be used to provide power to a booster 319, which may be used to increase the strength of the TX signal transmitted by the TX driver 313.

Figure 4:
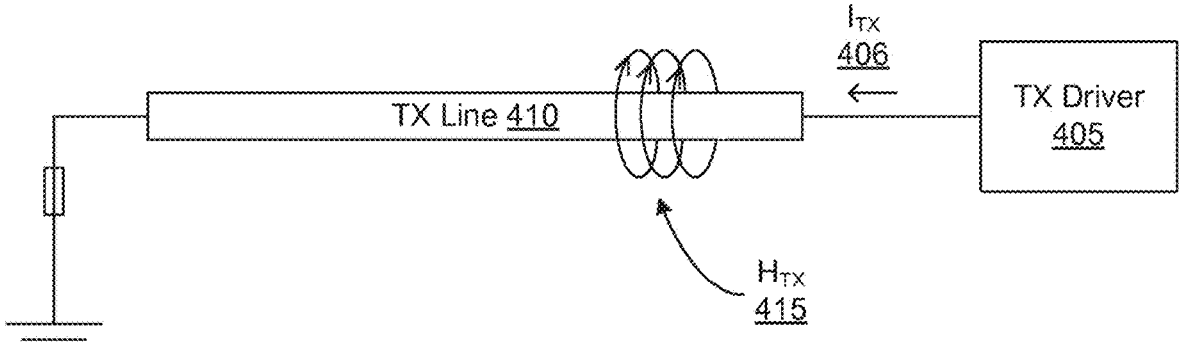
FIG. 4 is a block diagram illustrating one embodiment of a magnetic field generated by a transmit (TX) line.

FIG. 4 is a block diagram illustrating one embodiment of a magnetic field $H_{TX}$ 415 generated by a TX line 410. The TX driver 405 transmits an electrical current $I_{TX}$ 406 to the TX line 410. As the current $I_{TX}$ 406 passes through (e.g., propagates through) the TX line 410 (going from right to left), a magnetic field $H_{TX}$ 415 is generated. The magnetic field $H_{TX}$ 415 is shown in FIG. 4 as circles flowing in a clock-wise direction around the TX line 410. In one embodiment, a stylus may detect whether the TX line 410 is generated the magnetic field $H_{TX}$ 415 and may transmit a TX signal, based on whether the magnetic field $H_{TX}$ 415 is detected.

Figure 5:
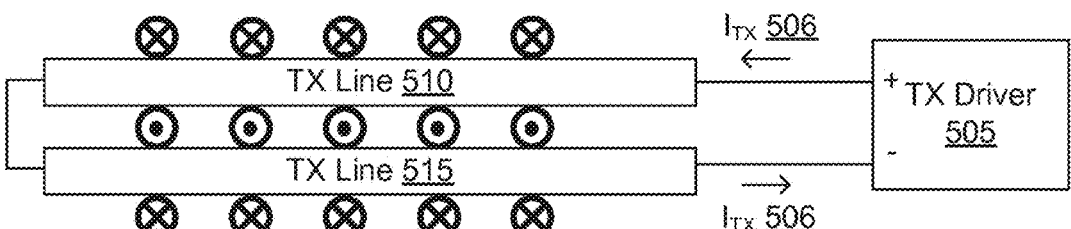
FIG. 5 is a block diagram illustrating an embodiment of a magnetic field generated by a plurality of TX lines.

FIG. 5 is a block diagram illustrating an embodiment of a magnetic field (e.g., an H-field) generated by a plurality of TX lines 510 and 515. The TX lines 510 and 515 are connected in series (e.g., one TX line is connected to the TX driver 505 via the other TX line). The TX driver 505 generates current $I_{TX}$ 506 which flows through the TX line 510. The electrical signal or current $I_{TX}$ 506 passes through the TX line 510 (going from right to left) and then passes through TX line 515 (going from left to right). As the electrical current $I_{TX}$ 506 passes through (e.g., propagates through) the TX lines 510 and 515, a magnetic field (e.g., an H-field) is generated. The magnetic field is represented using dotted circles and crossed circles. The dotted circles (e.g., the circles with dots inside) represent a vertical H-field coming out of the page. The crossed circles (e.g., the circles with an "X" inside) represent a vertical H-field going into the page. In one embodiment, a stylus may detect whether the TX lines 510 and 515 are generating the H-field and may transmit a TX signal, based on whether the H-field (e.g., the magnetic field) is detected.

Figure 6:
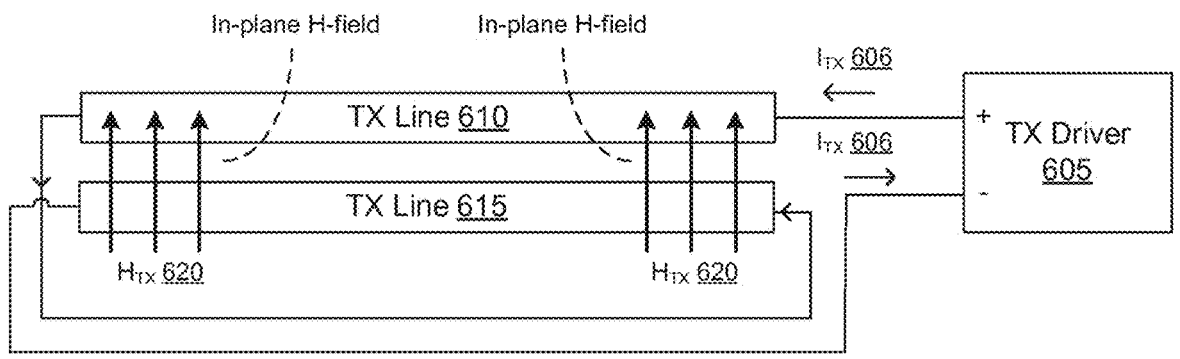
FIG. 6 is a block diagram illustrating another embodiment of a magnetic field generated by a plurality of TX lines.

FIG. 6 is a block diagram illustrating another embodiment of a magnetic field $H_{TX}$ 620 generated by a plurality of TX lines 610 and 615. The TX lines 610 and 615 are connected in series. The TX driver 605 generates current $I_{TX}$ 606 which flows through the TX line 610. The electrical current $I_{TX}$ 606 passes through the TX line 610 (going from right to left) and then passes through TX line 615 (going from right to left). As the electrical current $I_{TX}$ 606 passes through (e.g., propagates through) the TX lines 610 and 615 (going from right to left), a magnetic field $H_{TX}$ 620 (e.g., an H-field) is generated. The magnetic field $H_{TX}$ 620 is shown in FIG. 4 as a plane which is parallel to the plane where the TX lines 610 and 615 are located (e.g., an in-plane H-field). In one embodiment, a stylus may detect whether the TX lines 610 and 615 are generating the magnetic field $H_{TX}$ 620 and may transmit a TX signal, based on whether the magnetic field $H_{TX}$ 620 is detected.

Figure 7:
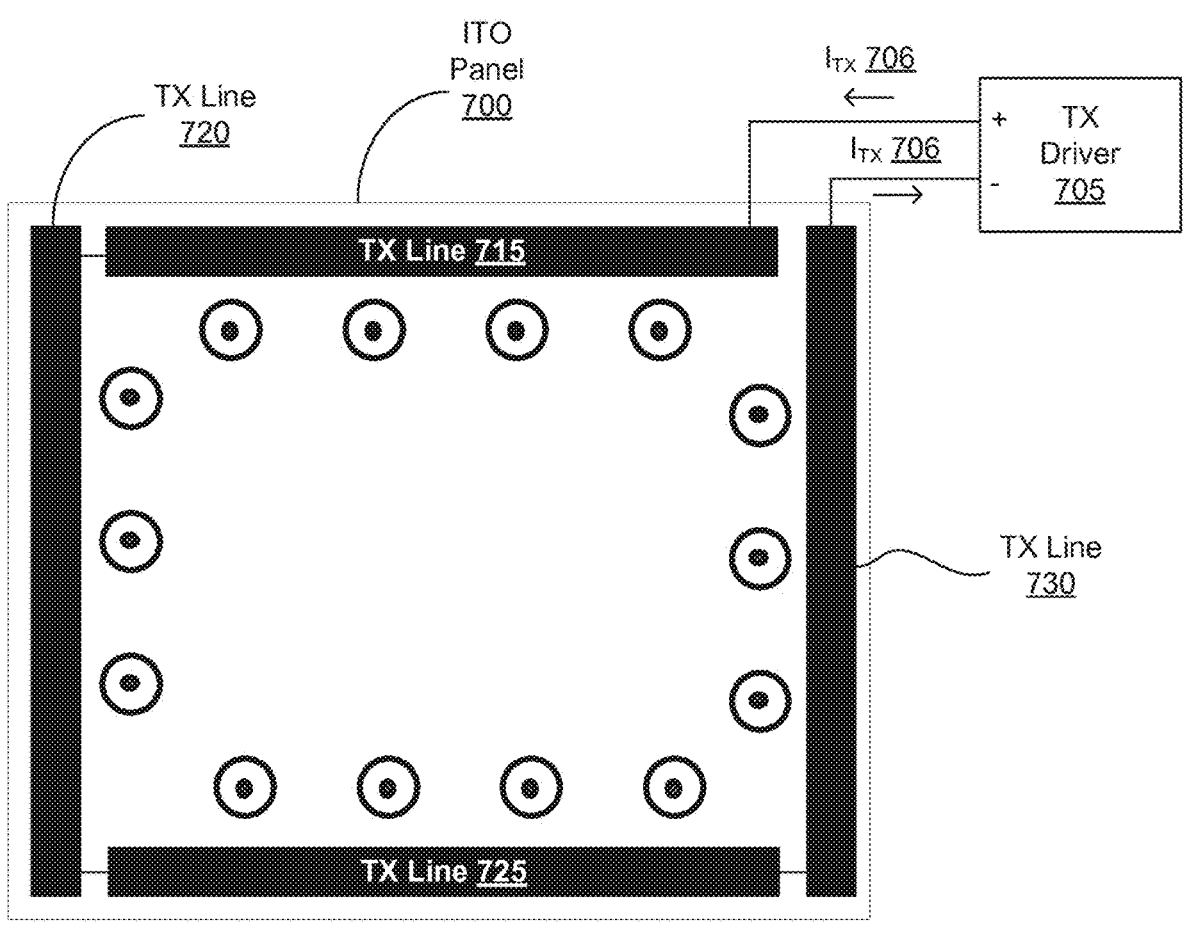
FIG. 7 is a block diagram illustrating a further embodiment of a magnetic field generated by a plurality of TX lines.

FIG. 7 is a block diagram illustrating a further embodiment of a magnetic field (e.g., an H-field) generated by a plurality of TX lines 715, 720, 725, and 730 in an ITO panel 700. The TX lines 715, 720, 725, and 730 are connected in series. The TX driver 705 generates current $I_{TX}$ 706 which flows through the TX line 715. The electrical current $I_{TX}$ 706 passes through the TX line 715 to TX line 720. The electrical current $I_{TX}$ 706 then passes through the TX line 720 to TX line 725. The electrical current $I_{TX}$ 706 further passes through the TX line 725 to TX line 730. As the electrical current $I_{TX}$ 706 passes through (e.g., propagates through) the TX lines 715, 720, 725, and 730 a magnetic field (e.g., an H-field) is generated. The magnetic field is represented using dotted circles. The dotted circles (e.g., the circles with dots inside) represent a vertical H-field coming out of the page. As shown in the figure, the magnetic filed is generated above the ITO panel 700 (the vertical H-field is coming up out of the ITO panel 700). In one embodiment, a stylus may detect whether the H-field generated by the TX lines 715, 720, 725, and 730, and may transmit a TX signal, based on whether the H-field (e.g., the magnetic field) is detected.

Figures 8, 9:
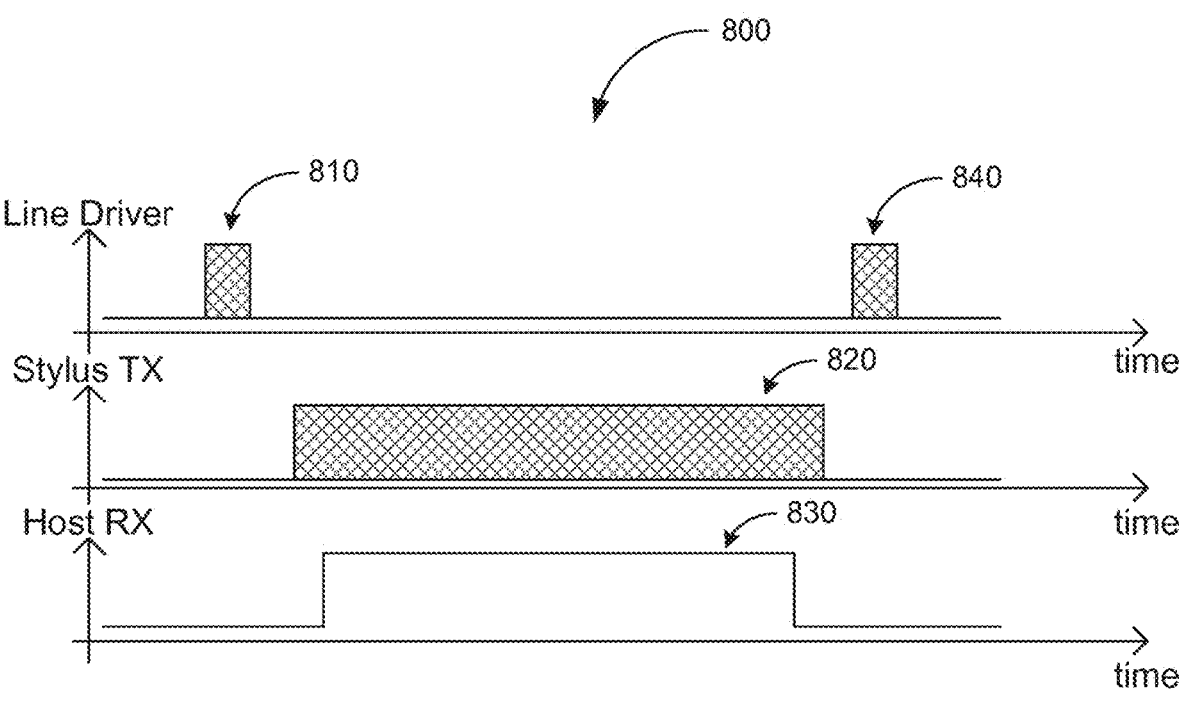
FIG. 8 is a timing diagram illustrating an embodiment of a synchronization between a stylus and a host.
FIG. 9 is a timing diagram illustrating another embodiment of a synchronization between a stylus and a host.

FIG. 8 is a timing diagram 800 illustrating an embodiment of a synchronization between a stylus and a host. The timing diagram 800 includes a line driver timeline, a stylus TX timeline, and a panel RX timeline.

As shown in FIG. 8, the line driver generates a magnetic field (e.g., an H-field) at time interval 810 by transmitting an electrical signal or current through one or more electrodes in an ITO panel in the host. The H-field generated during time interval 810 may be a synchronization burst which the stylus may detect in order to synchronize the operation of the stylus with the host. The stylus may detect the H-field (e.g., the synchronization burst) and synchronize the operation of the stylus to the host using a PLL circuit as described above. The stylus may transmit a stylus TX signal after the host stops generating the H-field at time interval 820. The host will listen (e.g., detect) on one or more of the rows and columns of electrodes in the capacitive sense array for the stylus TX signal at time interval 830.

FIG. 9 is a timing diagram 900 illustrating another embodiment of a synchronization between a stylus and a host. The timing diagram 900 includes a line driver timeline, a stylus TX timeline, and a panel RX timeline.

As shown in FIG. 9, the line driver generates a magnetic field (e.g., an H-field) at time interval 910 by transmitting an electrical signal or current through one or more electrodes in an ITO panel in the host. The H-field generated during time interval 910 may be used by the stylus to synchronize the operation of the stylus with the host. The stylus may detect the H-field (e.g., the synchronization burst) and synchronize the operation of the stylus to the host using a PLL circuit as described above. The stylus may transmit a stylus TX signal while the stylus is able to detect the H-field at time interval 920 (e.g., the stylus will transmit a TX signal for a time interval which overlaps with the time interval in which an H-field is generated). The host will listen (e.g., detect) on one or more of the rows and columns of electrodes in the capacitive sense array for the stylus TX signal at time interval 930.

Figure 10:
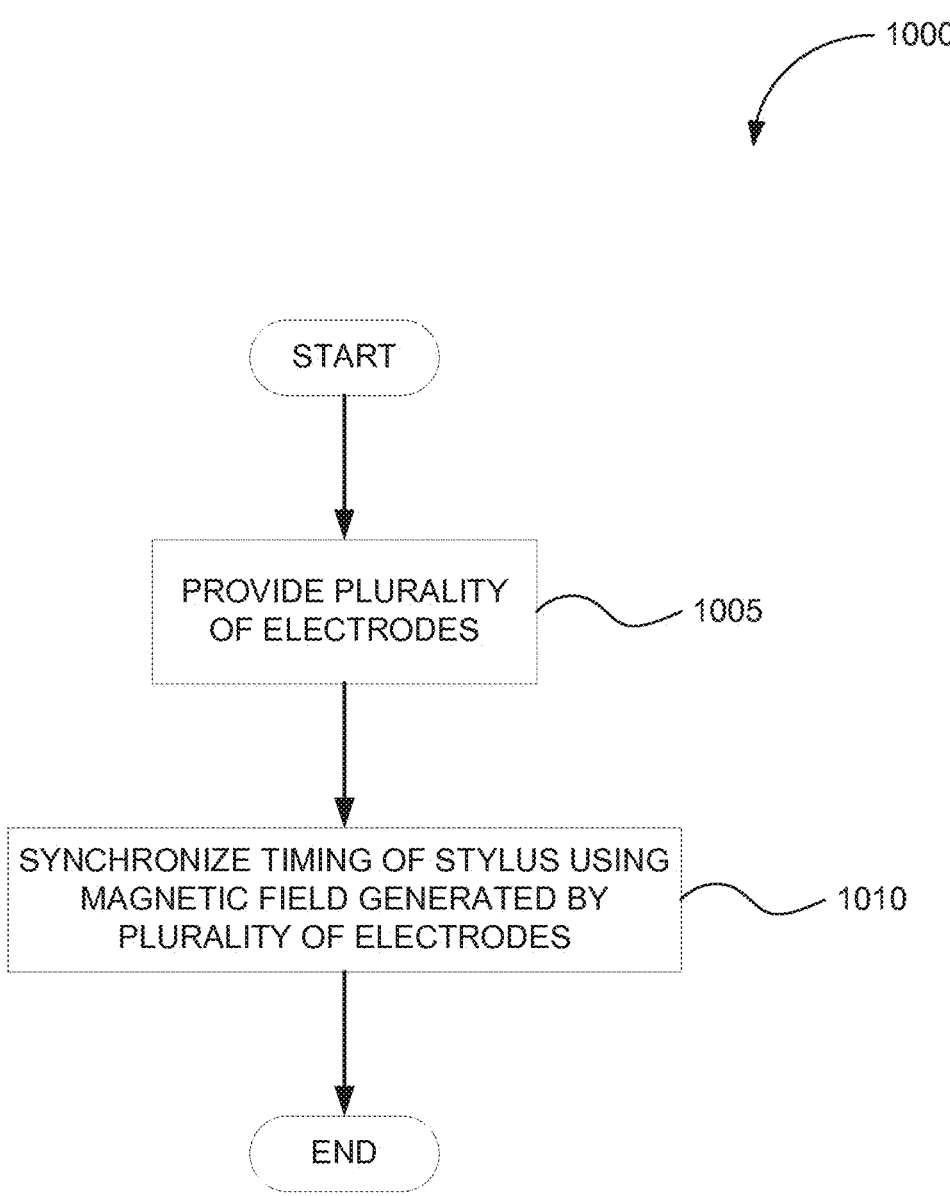
FIG. 10 is a flow chart of an embodiment of a method of synchronizing a stylus to a host.

FIG. 10 is a flow chart of one embodiment of a method 1000 of synchronizing a stylus to a host. The method 1000 may be performed by a host that comprises hardware (e.g., circuitry, electrodes, switches, dedicated logic, programmable logic, microcode), software (e.g., instructions run on a processing device to perform hardware simulation), or a combination thereof. In one embodiment, method 1000 may be performed by processing device 110 as shown in FIG. 1.

The method 1000 begins with the host device providing a plurality of electrodes in a capacitive sense array (block 1005). In one embodiment, the plurality of electrodes may be part of an ITO panel or a touch screen. Any combination or sequence of the plurality of electrodes may be used to generate the magnetic field. At block 1010, the host device synchronizes the timing of the stylus using the magnetic field generated by the plurality of the electrodes. In another embodiment, the stylus may detect the magnetic field generated by the plurality of nodes and may transmit a TX signal based on whether the magnetic field is detected. In one embodiment, the stylus may transmit the TX signal while the magnetic field is detected and the host device may listen (e.g., scan) for a TX signal from the stylus while the host is generating the magnetic field. In another embodiment, the stylus may transmit the TX signal after the magnetic field is no longer detected and the host device may listen (e.g., scan) for a TX signal from the stylus after the host stops generating the magnetic field.

Figure 11:
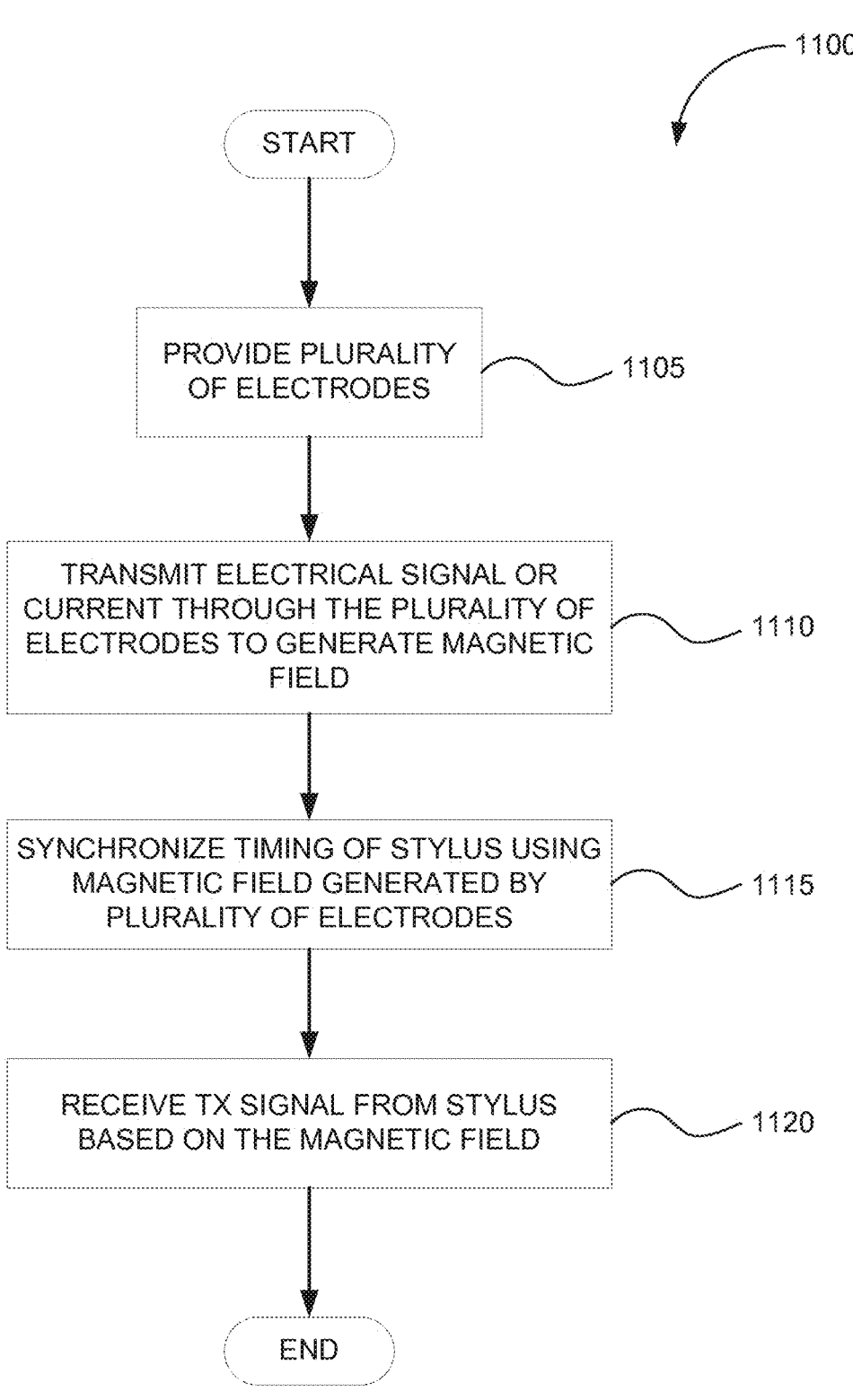
FIG. 11 is a flow chart of another embodiment of a method of synchronizing a stylus to a host.

FIG. 11 is a flow chart of one embodiment of a method 1100 of synchronizing a stylus to a host. The method 1100 may be performed by a host that comprises hardware (e.g., circuitry, electrodes, switches, dedicated logic, programmable logic, microcode), software (e.g., instructions run on a processing device to perform hardware simulation), or a combination thereof. In one embodiment, method 1100 may be performed by processing device 110 as shown in FIG. 1.

The method 1100 begins with the host device providing a plurality of electrodes in a capacitive sense array (block 1105). In one embodiment, the plurality of electrodes may be part of an ITO panel or a touch screen. Any combination or sequence of the plurality of electrodes may be used to generate the magnetic field. At block 1110, the host device transmits an electrical signal or current through the one or more electrodes to generate a magnetic field. The host device synchronizes the timing of the stylus using the magnetic field generated by the plurality of the electrodes, at block 1115. In one embodiment, the stylus may detected the magnetic field generated by the plurality of nodes and may transmit a TX signal based on whether the magnetic field is detected. At block 1120, the host device listens or scans for a TX signal from the stylus based on the magnetic field. In one embodiment, the host device listens or scans for a TX signal based on the timing of the magnetic field. For example, the host device may listen (e.g., scan) for a TX signal from the stylus only while the host is generating the magnetic field. In another example, the host device may listen (e.g., scan) for a TX signal from the stylus only after the host stops generating the magnetic field.

Figure 12:
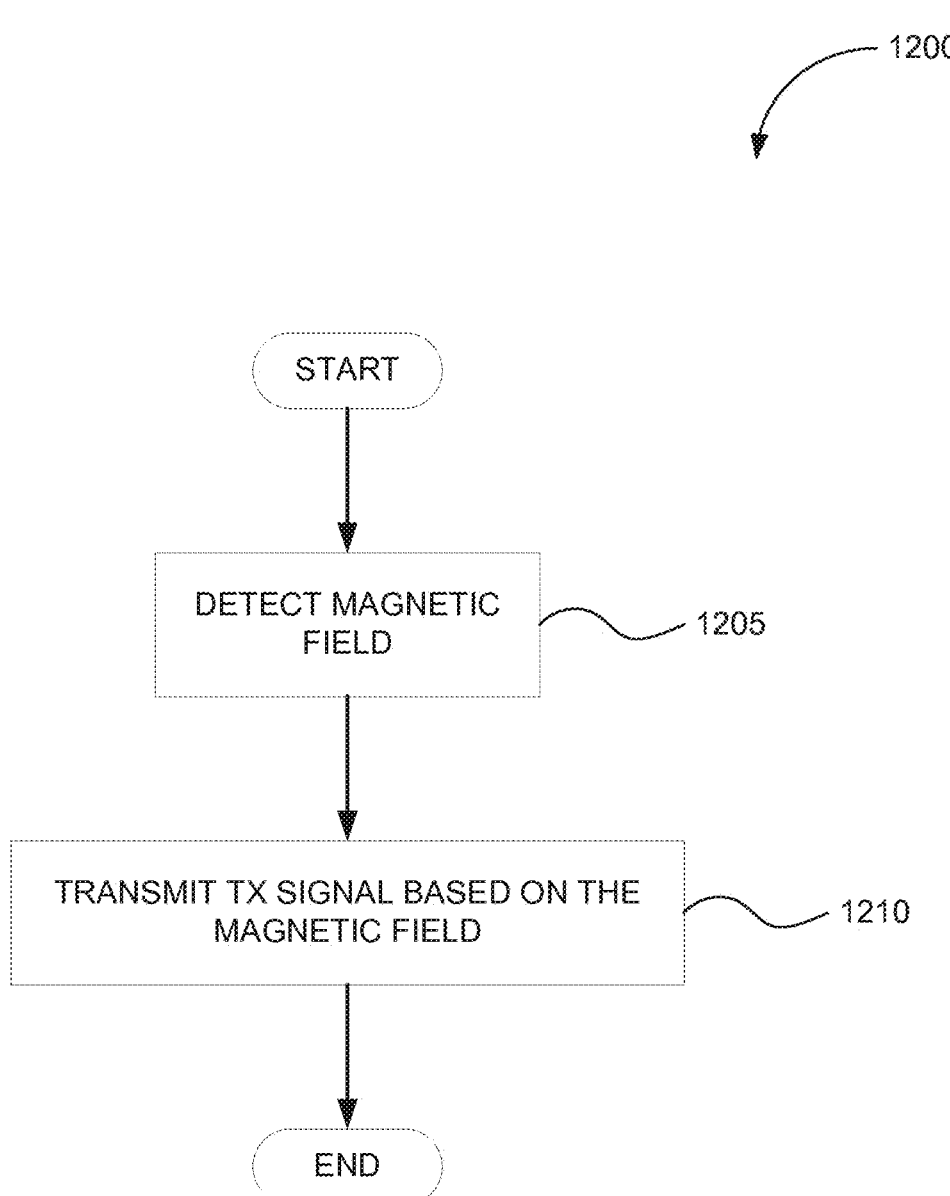
FIG. 12 is a flow chart of a further of a method of synchronizing a stylus to a host.

FIG. 12 is a flow chart of a further of a method of synchronizing a stylus to a host. The method 1200 may be performed by a host that comprises hardware (e.g., circuitry, electrodes, switches, dedicated logic, programmable logic, microcode), software (e.g., instructions run on a processing device to perform hardware simulation), or a combination thereof. In one embodiment, method 1200 may be performed by processing device 110 as shown in FIG. 1.

The method 1200 begins with the stylus detecting a magnetic field generated by a plurality of electrodes in the host device (block 1005). At block 1010, the stylus synchronizes the operation of the stylus (e.g., synchronize when the stylus should transmit a TX signal) using the magnetic field generated by the plurality of the electrodes. In one embodiment, the stylus may transmit the TX signal while the magnetic field is detected. In another embodiment, the stylus may transmit the TX signal after the magnetic field is no longer detected. In one embodiment, the stylus may use a PLL circuit to synchronize the operation of the stylus with the host, based on magnetic field.

The embodiments described herein describe various aspects of stylus to host synchronization methods. In one embodiment, a magnetic field may be generated using one or more electrodes in a capacitive sense array. A stylus may synchronize its operation to the host by detecting the magnetic field and transmitting a transmit signal based on whether the stylus is able to detect the magnetic field. Some of the embodiments described herein allow a stylus to synchronize its operation to the host without using a radio frequency (RF) antenna.

Embodiments of the present disclosure, described herein, include various operations. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other types of mediums.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the disclosure has been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus comprising:
   a capacitive sense array comprising a plurality of electrodes, wherein
   in a first mode for detecting touch objects, the plurality of electrodes are configured to operate as TX and RX electrodes of a mutual capacitive sense array; and
   in a second mode for detecting a stylus,
      each of the TX electrodes of the plurality of electrodes is supplied with a TX driver electrical current at one end, while an opposite end is coupled to a voltage potential configured to allow current to flow through the TX electrode, such that the TX driver electrical current passing through the TX electrode from the one end to the opposite end generates a magnetic field that interacts with the stylus, and
   the plurality of electrodes are configured to operate as RX electrodes to detect the stylus,
   wherein each of the TX electrodes extends from the one end to the opposite end across the capacitive sense array such that the one end and the opposite end are located on opposite sides of the capacitive sense array.

2. The apparatus of claim 1, wherein the magnetic field comprises an H-field.

3. The apparatus of claim 2, wherein the magnetic field is generated to circle around the TX electrode, through which the TX driver electrical current passes.

4. The apparatus of claim 1, wherein, in the second mode, each of the TX electrodes generates the magnetic field during a first time interval, and the RX electrodes detect the stylus during the first time interval.

5. The apparatus of claim 1, wherein, in the second mode, each of the TX electrodes generates the magnetic field during a first time interval, and the RX electrodes detect the stylus after the first time interval.

6. The apparatus of claim 1, wherein each of the TX electrodes configured to generate the magnetic field is positioned in parallel with one or more edges of the capacitive sense array.

7. The apparatus of claim 1, wherein the plurality of electrodes are connected in series to a voltage source.

8. A method comprising:
  providing a plurality of electrodes in a capacitive sense array;
  in a first mode for detecting touch objects, operating the plurality of electrodes as TX and RX electrodes of a mutual capacitive sense array; and
  in a second mode for detecting a stylus,
    passing a TX driver electrical current from one end to an opposite end of each of the TX electrodes of the plurality of electrodes to generate a magnetic field that interacts with the stylus, and
    using the plurality of electrodes as RX electrodes to detect the stylus,
  wherein each of the TX electrodes extends from the one end to the opposite end across the capacitive sense array such that the one end and the opposite end are located on opposite sides of the capacitive sense array.

9. The method of claim 8, wherein the magnetic field comprises an H-field.

10. The method of claim 9, wherein the magnetic field is generated to circle around the TX electrode, through which the TX driver electrical current passes.

11. The method of claim 8, wherein, in the second mode, each of the TX electrodes generates the magnetic field during a first time interval, and the RX electrodes detect the stylus during the first time interval.

12. The method of claim 8, wherein, in the second mode, each of the TX electrodes generates the magnetic field during a first time interval, and the RX electrodes detect the stylus after the first time interval.

13. The method of claim 8, wherein each of the TX electrodes configured to generate the magnetic field is positioned in parallel with one or more edges of the capacitive sense array.

14. The method of claim 8, wherein the plurality of electrodes are connected in series to a voltage source.

15. A stylus comprising:
  a sensor configured to detect a magnetic field generated by each of TX electrodes of a plurality of electrodes of a capacitive sense array operating in a second mode in which the TX electrode is supplied with a TX driver electrical current at one end, while an opposite end is coupled to a voltage potential configured to allow current to flow through the TX electrode, such that the TX driver electrical current passing through the TX electrode from the one end to the opposite end generates the magnetic field,
  wherein each of the TX electrodes extends from the one end to the opposite end across the capacitive sense array such that the one end and the opposite end are located on opposite sides of the capacitive sense array, and
  wherein the plurality of electrodes of the capacitive sense array operating in a first mode are configured to operate as TX and RX electrodes of a mutual capacitive sense array to detect touch objects; and
  a processing device configured to generate a synchronized signal based on the magnetic field, wherein the synchronized signal is received by the plurality of electrodes of the capacitive sense array operating in the second mode as RX electrodes to detect the stylus.

16. The stylus of claim 15, further comprising:
  a transmitter configured to transmit the synchronized signal to the capacitive sense array.

17. The stylus of claim 15, wherein the processing device is configured to generate the synchronized signal while the sensor detects the magnetic field.

18. The stylus of claim 15, wherein the processing device is configured to generate the synchronized signal after the sensor detects the magnetic field.

19. The stylus of claim 15, wherein the magnetic field comprises an H-field.

20. The stylus of claim 15, wherein the magnetic field is generated to circle around the TX electrode, through which the TX driver electrical current passes.

*    *    *    *    *